Figure 1:
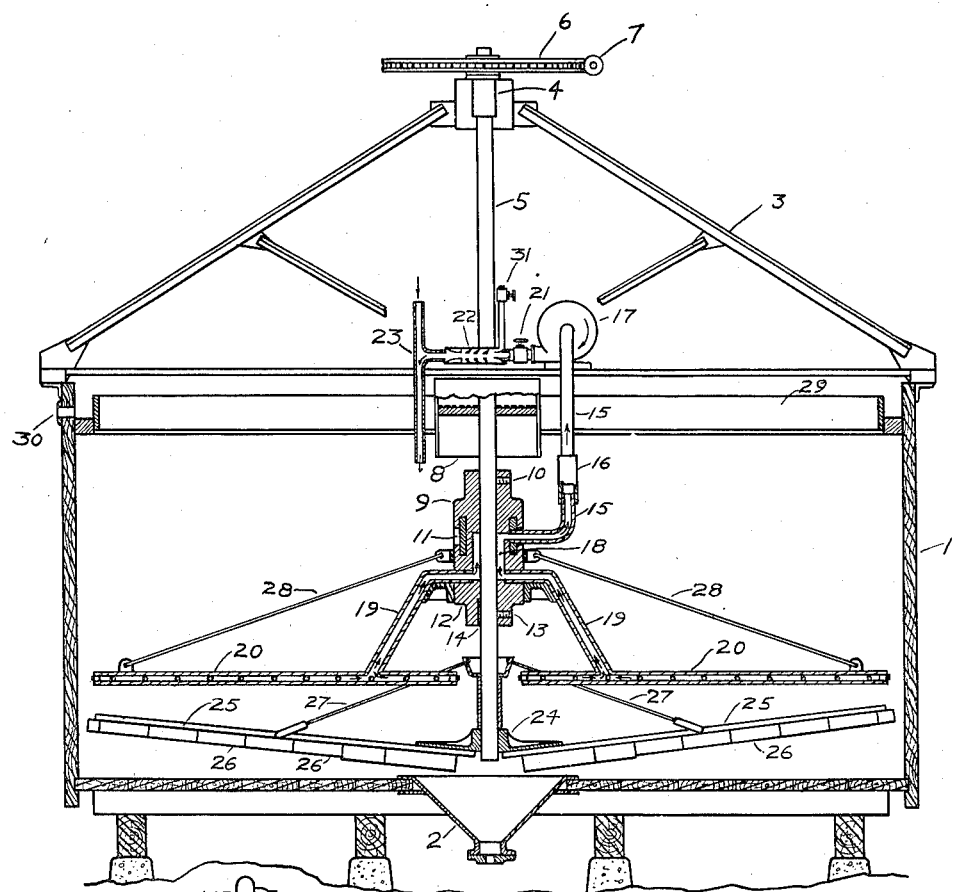

July 14, 1936. J. M. PATEK 2,047,798
APPARATUS AND PROCESS FOR SEPARATING SLIME AND SAND SUSPENSIONS
Filed May 4, 1934

INVENTOR.
John Mark Patek
BY Louis Quales
ATTORNEY.

Patented July 14, 1936

2,047,798

UNITED STATES PATENT OFFICE 2,047,798

APPARATUS AND PROCESS FOR SEPARATING SLIME AND SAND SUSPENSIONS

John Mark Patek, Milwaukee, Wis.

Application May 4, 1934, Serial No. 723,818

4 Claims. (Cl. 209—465)

This invention resides in a novel apparatus and process for the separation of slime or very finely divided material from sands or particles of larger dimensions. The method is particularly concerned with the introduction of the mixed sands and slime into a relatively quiescent body of liquid while continuously removing settled sands from the bottom of said body of liquid, withdrawing intermediate the top and bottom of said liquid a limited quantity of fluid, mechanically scouring the withdrawn fluid so that any slime or fine particles adhering to the sands are loosened therefrom, and returning the scoured fluid to the main body of liquid in a manner not to disturb the same, while permitting fluid containing slime to overflow from the upper part of the body of fluid. A novel apparatus suitable for the carrying on of this method consists in a tank having means in the bottom for the removal of settled sands, and above the bottom and below the top of the tank an inlet system so distributed that liquid may be withdrawn from many different points distributed intermediate the top and the bottom of the tank. The apparatus further consists in mechanical means for scouring the withdrawn fluid and then returning the same, preferably under a low head, to the upper part of the tank so that the contents are not unduly disturbed. The tank is further provided with an overflow near the upper portion thereof from which separated slime may escape. The material to be treated is fed into the upper, central part of the tank through regulating means which permit the admission of the feed without undue agitation of the contents of the tank.

Heretofore solid material in suspension in fluids has been recovered by settling and various forms of apparatus have been employed whereby the continuous separation thereof is effected. Separations performed in this manner are suitable for removal of solid materials from fluids, but little classification between the fine and coarser suspended matter can be obtained. However, some of the more finely divided matter will remain in suspension and can be decanted, leaving the larger particles together with much of the slime. Efforts have been made to obtain better separation of the larger particles or sands from slime by settling methods. In these methods an action properly called hindered settling is resorted to in which the sands or larger particles are caused to settle downwardly against a rising movement of fluid, the rate of rise of which is regulated to a flow slightly in excess of the rate of settling of the finer particles. Hindered settling has been used with certain limited success. Further, by the method of hindered settling the underflow is highly diluted and consists of a pulp which is far too dilute for treatment by flotation unless additional settling treatment is resorted to. This is also true of other existing hydraulic classifiers.

This invention provides a satisfactory and practical solution of the problem of separating slime from sands. The obtaining of the novel result is dependent upon the discovery that when fluid is withdrawn between the top and bottom of a body of the suspended slime and sands and is then subjected to a scouring action slime, which adheres to the sand particles, thus becomes detached and that when this scoured material is again returned to the body of fluid no slime is carried downwardly by the rapidly settleable sands and in this way the sands, quite free of slime, may be settled from the mixture and obtained in the form of a thickened pulp.

The invention further involves the creation intermediate the top and bottom of a body of settleable fluid of a somewhat disturbed zone having a degree of turbulence sufficient to render all except clean sand particles nonsettleable. The zone of disturbance is sufficient to provide conveying velocities to the suspended slime as well as the suspended slime-coated sand. As a result of this all slime-coated sand particles are insured repeated return through the scouring mechanism until all slime-coating has been detached therefrom. The settled or thickened sands collected at the bottom of the body of liquid are quite free of slime in contrast to the settled material heretofore obtainable from sand-slime mixtures.

Figure 2:
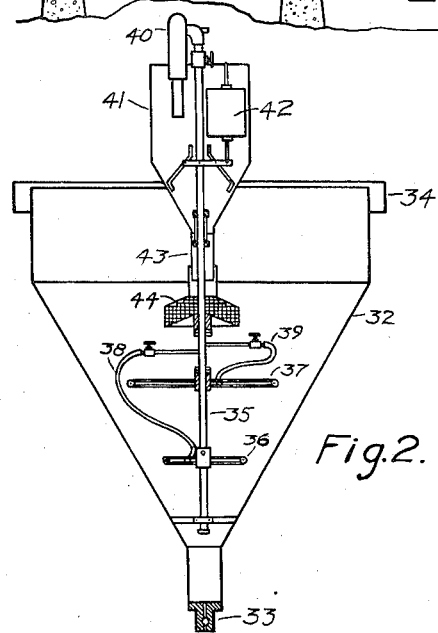

The process and apparatus of this invention are best described by reference to the accompanying drawing wherein Fig. 1 shows, in section, a form of apparatus of this invention, and Fig. 2 shows, in section, another form of the apparatus of this invention.

Referring to Fig. 1, the apparatus is shown consisting of a wooden tank 1. In the bottom of the tank there is a conical outlet 2 near the center of the tank. Above the tank and resting upon the same is a truss 3 having a bearing 4 at its upper end and another bearing, not shown, above the level of the tank. Mounted to turn in the bearing 4 is a central shaft 5, which is provided at its upper end with a worm gear 6 which meshes with a worm pinion 7 driven by a source of power not shown. The shaft 5 passes downwardly through a feed-cup 8, which for the sake of clearness is shown with parts broken away.

Mounted upon shaft 5 and below the feed-cup 8 is a gland 9 which is fastened securely to the shaft 5 by a set-screw 10. The gland 9 has an annular groove in the under side thereof into which a slip-ring 11 is inserted. The slip-ring extends downwardly and is inserted into an annular groove in the upper face of a lower gland 12. The lower gland is securely fastened to the shaft 5 by a set-screw 13 and a key 14. The slip-ring has an opening in one side in which an outlet pipe 15 is secured. The outlet pipe 15 bears an adjustable sleeve 16 permitting vertical adjustment of the same. The pipe 15, however, extends upwardly and is securely fastened to the inlet of a centrifugal pump 17 and is thus held against rotational movement with the shaft 5 and as a result holds the slip-ring 11 against rotational movement. The lower gland 12 has an inner chamber 18 which is in communication with the outlet pipe 15 and also with inlet extensions 19.

It will be seen from the above description of the drawing that as shaft 5 is rotated upper and lower glands 9 and 12 rotate therewith and carry the inlet extensions 19 with them. The slip-ring 11, however, remains stationary and as the shaft revolves the revolving inlet extensions 19 remain in communication with the outlet pipe 15. The inlet extensions 19 extend downwardly and connect with distributed inlet pipes 20. The distributed inlet pipes are provided with holes throughout their length through which fluid may enter and pass upwardly through extensions 19 and pipe 15 into the centrifugal pump 17. The outlet of the centrifugal pump 17 passes through a valve 21 and an ejector 22, thence into a vented discharge pipe 23, which by virtue of the atmospheric vent discharges the fluid back into the tank at a low head.

Fastened to the lower end of the shaft 5 is a spider 24 bearing rake arms 25 provided with teeth 26 set at an angle to the rake arms so that as the arms rotate with the shaft 5 the angularly spaced teeth 26 will convey solid material inwardly to the cone-shaped outlet 2. Both the rake arms 25 and the distributed inlet pipes 20 are provided, respectively, with supporting bars 27 and 28.

At the upper part of the tank 1 an overflow launder 29 is provided, which discharges through outlet 30. The operation of the apparatus shown in Fig. 1 is as follows: A suspended mixture of slime and sand is fed into the inlet or feed-cup 8 until the tank is filled to the level of the launder 29. The outlet 2, of course, is kept closed, by means not shown. When the tank is filled the centrifugal pump 17 is started and the shaft 5 rotated through the worm-gear 6. Feeding of the suspended sands and slime is continued at a moderate rate and at intervals, or, if desired, continuously the outlet 2 is opened and the thickened sands there removed. As long as the feed is continued a suspension containing slime escapes over the launder 29 and is discharged through the outlet 30. The pump 17 withdraws the fluid through the distributed inlet pipes 20 and this causes a slight local disturbance in the liquid intermediate the top and bottom of the tank and at the same time draws a portion of the suspension existing in this zone out of the tank. The mechanical action of the impeller blades scours adhering slime from the sand particles. The discharge from the pump, therefore, consists of a suspension of clean sand and slime.

Further scouring and loosening of the slime can be accomplished by the admission of water or other fluid through a valve 31 into the ejector 22. The discharge from the ejector 22 then passes through the vented discharge pipe 23 back into the tank. Any slime contained in this suspension being non-settleable is carried out over the launder. The clean sands being of a rapid settling nature pass downwardly and through the disturbed zone created by the distributed inlet. If by chance any of this sand is caught and recirculated it will have repeated opportunity to penetrate the disturbed zone and eventually will arrive at the rakes and be discharged.

The particles contained in a sand-slime mixture will consist of three classes: first, the slime; second, the fast settling sand; and, third, sand particles with slime adhering thereto. This invention is partly based upon the useful discovery that slime-coated sand particles have a rate of settling less than that of clean sand particles. The creation of the disturbed zone intermediate the bottom outlet and the overflow of the tank therefore creates a barrier to the downward passage of slime-coated particles, due to their lower rate of settling, and in effect holds said particles in readiness to be caught by the inlet for scouring treatment, which automatically is repeated until the sand is relieved of its slime coating. There prevails in the lower part of the tank, however, a relatively quiescent state which permits the clean sand which escapes downwardly through the disturbed zone to be collected into a thickened pulp and, in contrast to all other methods or apparatus, this relatively quiescent zone is protected from the entrance of any slime or slime-coated particles.

In Fig. 2 is shown another form of the apparatus of this invention wherein a cone-shaped bottom is employed in order to obviate the necessity for rake arms or other gathering mechanism. This form of the apparatus comprises a cone-shaped tank 32 having a discharge valve 33 in the bottom. Around the upper edge of the tank 32 is a launder 34. Located centrally within the tank is a stationary pipe 35 upon which are adjustably mounted stationary distributed inlet rings 36 and 37. Inlet rings 36 and 37 are connected through flexible tubing 38 and 39 with the central stationary pipe 35 which rises above the top of the tank and enters the inlet of a pump 40. The pump 40 discharges into a central cup 41 which has a conical bottom terminating in a discharge sleeve 43. The discharge sleeve 43 is connected to a distributing screen 44, the latter being provided with screen openings to retard the discharge of fluid and to permit it to enter the tank 32 without unduly disturbing the same. The central cup 41 contains a regulating float 42 which is connected through means not shown to an inlet pipe, not shown, through which the feed is introduced. The apparatus shown in Fig. 2 is fed continuously under the regulation of float 42 with sand and slime suspension and slime is discharged through the launder 34 continuously. Periodically or continuously the settled, thickened sand is removed through the outlet 33. The manner in which the slime-coated sands are scoured and separated is the same in this apparatus as that described in connection with the apparatus shown in Fig. 1.

While the machine of this invention has been described in detail in connection with certain particular forms thereof, it is intended that the protection of Letters Patent to be granted thereon be not unnecessarily limited thereby, but extend to the full spirit of the invention as represented by the scope of the claims appended hereto.

What I claim as my invention is:

1. In an apparatus for separating fine material from sands, the combination comprising a tank having a discharge launder for fluid at the upper rim thereof, means for feeding fluid into said tank, an outlet in the bottom of said tank for the removal of settled, thickened material, a distributed fluid inlet intermediate said outlet and the top of said tank, means for drawing fluid through said inlet and highly agitating and scouring the fluid so withdrawn, and means for discharging said fluid back into the upper portion of said tank.

2. The process of separating a mixture of fine material and sands into a thickened sand and a slime, which consists in placing said mixture in suspension in a liquid, feeding said suspension into a substantially quiescent body of liquid, continually withdrawing a portion of said liquid body from a point intermediate the top and bottom thereof, scouring the portion so withdrawn, and returning the scoured portion to the upper portion of said liquid body while permitting a slime to overflow from the top of said body and while removing a thickened sand from the bottom thereof.

3. In an apparatus for separating fine material from sands, the combination comprising a tank, a collecting rake rotatable in the bottom of said tank, the bottom of said tank being provided with an opening positioned to receive material collected by said rake and to discharge said material from said tank, a distributed inlet mounted in said tank above said rake and rotatable with said rake, means including a stuffing-box for connecting said inlet with a non-rotating conduit, means for adjusting the height of said inlet, a fluid-moving means connected to said non-rotating conduit, means connected to the discharge of said fluid-moving means for returning the fluid discharged therefrom under low head to the upper part of said tank, means for feeding a fluid to the tank, and means for permitting overflow from said tank.

4. In an apparatus for separating fine material from sands, the combination comprising a tank having a substantially cone-shaped bottom, a fluid inlet for feed entering said tank, an outlet in said bottom for the discharge of material directed to said outlet by the inclination of said bottom, an overflow for fluid near the top of said tank, a distributed fluid inlet adjustably fixed within said tank between the outlet and the overflow, means for drawing fluid through said inlet and highly agitating and scouring the fluid so withdrawn, and means for discharging said fluid back into the upper portion of said tank.

JOHN MARK PATEK.